US011433736B2

(12) United States Patent
Sathasivam et al.

(10) Patent No.: US 11,433,736 B2
(45) Date of Patent: Sep. 6, 2022

(54) METHODS AND SYSTEMS FOR THERMAL MANAGEMENT IN A VEHICLE

(71) Applicant: Ford Global Technologies, LLC, Dearborn, MI (US)

(72) Inventors: Sakthish Sathasivam, Ann Arbor, MI (US); Ashish Naidu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 822 days.

(21) Appl. No.: 16/250,839

(22) Filed: Jan. 17, 2019

(65) Prior Publication Data

US 2020/0231023 A1 Jul. 23, 2020

(51) Int. Cl.
| | |
|---|---|
| *B60H 1/00* | (2006.01) |
| *B60L 58/26* | (2019.01) |
| *B60K 11/02* | (2006.01) |
| *B60K 11/06* | (2006.01) |
| *H01M 10/656* | (2014.01) |

(52) U.S. Cl.
CPC ..... *B60H 1/00878* (2013.01); *B60H 1/00278* (2013.01); *B60K 11/02* (2013.01); *B60K 11/06* (2013.01); *B60L 58/26* (2019.02); *H01M 10/656* (2015.04); *B60H 2001/003* (2013.01); *B60H 2001/00307* (2013.01); *B60L 2240/545* (2013.01); *B60W 2510/0676* (2013.01); *B60W 2510/087* (2013.01); *H01M 2220/20* (2013.01)

(58) Field of Classification Search
CPC ........... H01M 2220/20; H01M 10/656; B60W 2510/0676; B60W 2510/087; B60L 2240/545; B60L 58/26; B60H 2001/003; B60H 2001/00307; B60H 1/00878; B60H 1/00278; B60K 11/02; B60K 11/06

USPC ............................................................ 701/36
See application file for complete search history.

(56) References Cited

U.S. PATENT DOCUMENTS

| 7,841,431 | B2 * | 11/2010 | Zhou ................... B60H 1/00278 |
| | | | 180/65.1 |
| 8,217,620 | B2 * | 7/2012 | Hanssen ............... H02J 7/1461 |
| | | | 320/104 |
| 8,336,319 | B2 * | 12/2012 | Johnston ................. B60L 3/003 |
| | | | 62/79 |
| 8,387,572 | B2 * | 3/2013 | Ulrey ...................... F01P 7/167 |
| | | | 123/41.44 |
| 9,067,589 | B1 * | 6/2015 | Zhao ..................... B60W 20/12 |
| 9,902,400 | B2 | 2/2018 | Yonan et al. |
| 2006/0224283 | A1 | 10/2006 | Fussey et al. |
| 2012/0290149 | A1 * | 11/2012 | Kristinsson ........... B60W 20/12 |
| | | | 701/2 |

FOREIGN PATENT DOCUMENTS

| DE | 102009027558 A1 | 1/2011 |
| DE | 102014004817 A1 | 10/2015 |
| DE | 102016011488 A1 | 3/2017 |
| WO | 2018019456 A1 | 2/2018 |

\* cited by examiner

*Primary Examiner* — Anthony R Jimenez
(74) *Attorney, Agent, or Firm* — David Kelley; McCoy Russell LLP

(57) ABSTRACT

Methods and systems are provided for providing thermal management for components of a vehicle. In one example, a method may include exchanging heat between different coolant systems via a heat exchanger using predicted data indicating estimated coolant temperatures for a vehicle trip and measured data indicating dynamic conditions for the vehicle trip.

16 Claims, 5 Drawing Sheets

METHODS AND SYSTEMS FOR THERMAL MANAGEMENT IN A VEHICLE

FIELD

The present description relates generally to methods and systems for controlling a vehicle engine to manage heat exchange between components of the vehicle.

BACKGROUND/SUMMARY

Vehicle systems include various coolant systems for exchanging heat between engine and/or vehicle system components and an associated coolant medium (e.g., air or liquid). The coolant systems may be used to heat up components or to cool down components in order to reach an optimum operating temperature for the components during vehicle operation. Thermal management in vehicles is often reactionary, where coolant flow and/or heat exchange is adjusted based on sensed data regarding a temperature of a component to be heated/cooled. Furthermore, coolant is typically locked to a given coolant system, such that the coolant is heated/cooled by the components of the associated coolant system.

However, the inventors herein have recognized potential issues with the above-described approaches to thermal management in vehicles. As one example, reactionary thermal management based only on current temperatures of components may lead to a delay in reaching an optimal temperature, which may lead to inefficient operation and/or increased wear of the components. As another example, individually controlling coolant systems may lead to the generation excess heat, which is vented to atmosphere, in some coolant systems, while other coolant systems are struggling to warm up.

In one example, the issues described above may be addressed by a method for controlling a heat exchanger in an engine system of a vehicle, the method including controlling a flow of coolant from each of a first coolant system and a second coolant system through a heat exchanger based on an estimated coolant temperature model and one or more dynamic conditions of the vehicle. As one example, coolant from a battery coolant system and/or an inverter system controller (ISC) coolant system may be selectively routed to the heat exchanger to be heated or cooled by coolant from an engine coolant system that is also routed to the heat exchanger. In this way, coolant from different systems may be used to adjust the temperature of one another through a centralized heat exchanger that is controlled based on predicted and measured conditions, thereby reducing wasted excess heat and reducing delays in reaching ideal coolant temperatures in the coolant systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
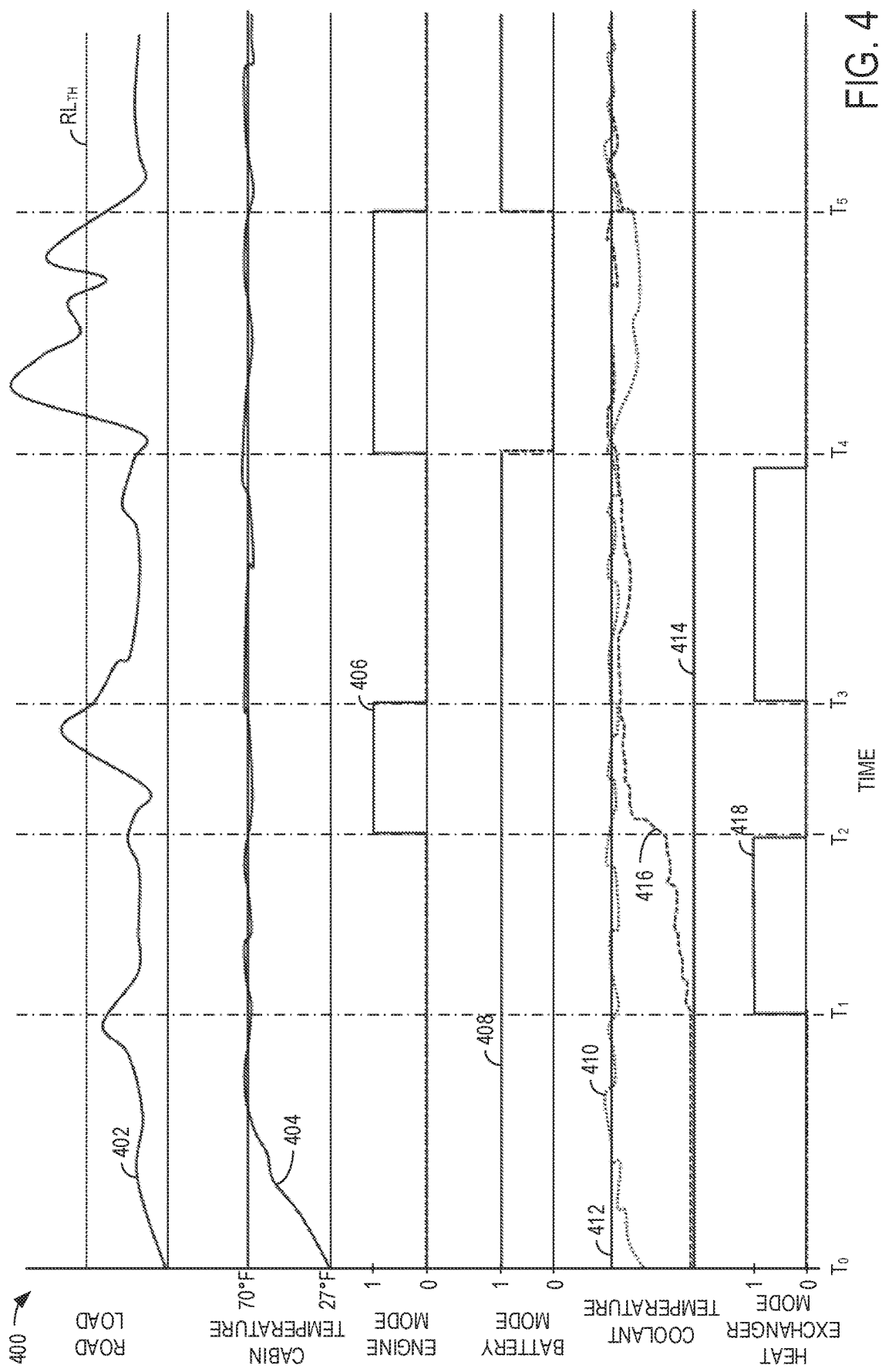
FIG. 4 shows a graph illustrating engine operating parameters for an engine during application of a thermal management strategy for providing heat from a battery coolant system and/or an inverter system controller (ISC) coolant system to an engine coolant system based on predicted and/or measured vehicle trip parameters.
Figure 5:
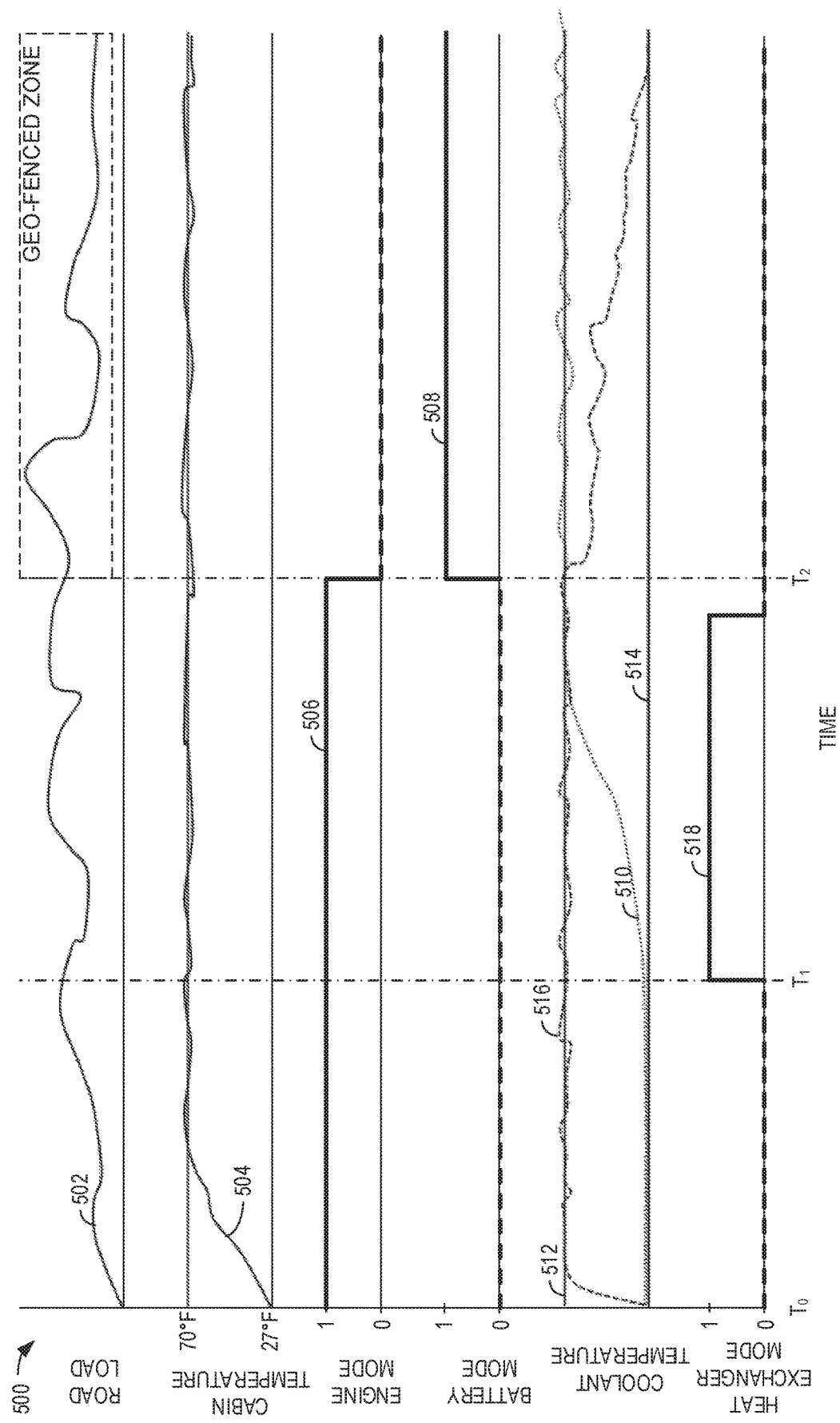
FIG. 5 shows a graph illustrating engine operating parameters for an engine during application of a thermal management strategy for providing heat from an engine coolant system to a battery coolant system and/or an ISC coolant system based on predicted and/or measured vehicle trip parameters.

The following description relates to systems and methods for controlling thermal management in a vehicle using a centralized heat exchanger that is configured to exchange heat between different coolant systems of the vehicle based on an estimation of coolant temperatures for the different coolant systems during a vehicle trip. A vehicle such as the vehicle shown by FIG. 1, may include multiple coolant systems, as illustrated in FIG. 2. Coolant from the different coolant systems may be directed to the centralized heat exchanger according to a thermal management schedule as described in FIG. 3. In some examples, as shown in FIG. 4, coolant from a battery and/or inverter system controller (ISC) coolant system(s) may be used to heat coolant from an engine coolant system in order to pre-emptively warm up the engine before engine start up. In other examples, as shown in FIG. 5, coolant from an engine coolant system may be used to heat coolant from a battery and/or ISC coolant system(s) in order to quickly raise the temperature of the electronic components to an ideal operating temperature (e.g., to increase efficiency of operation of the electronic components and/or reduce discharge rate of the battery). As further shown in FIGS. 3-5, the control of heat exchange between the systems may be based on predictive models and dynamically sensed data in order to reduce delays in adjusting temperatures for optimal operating conditions.

Figure 1:
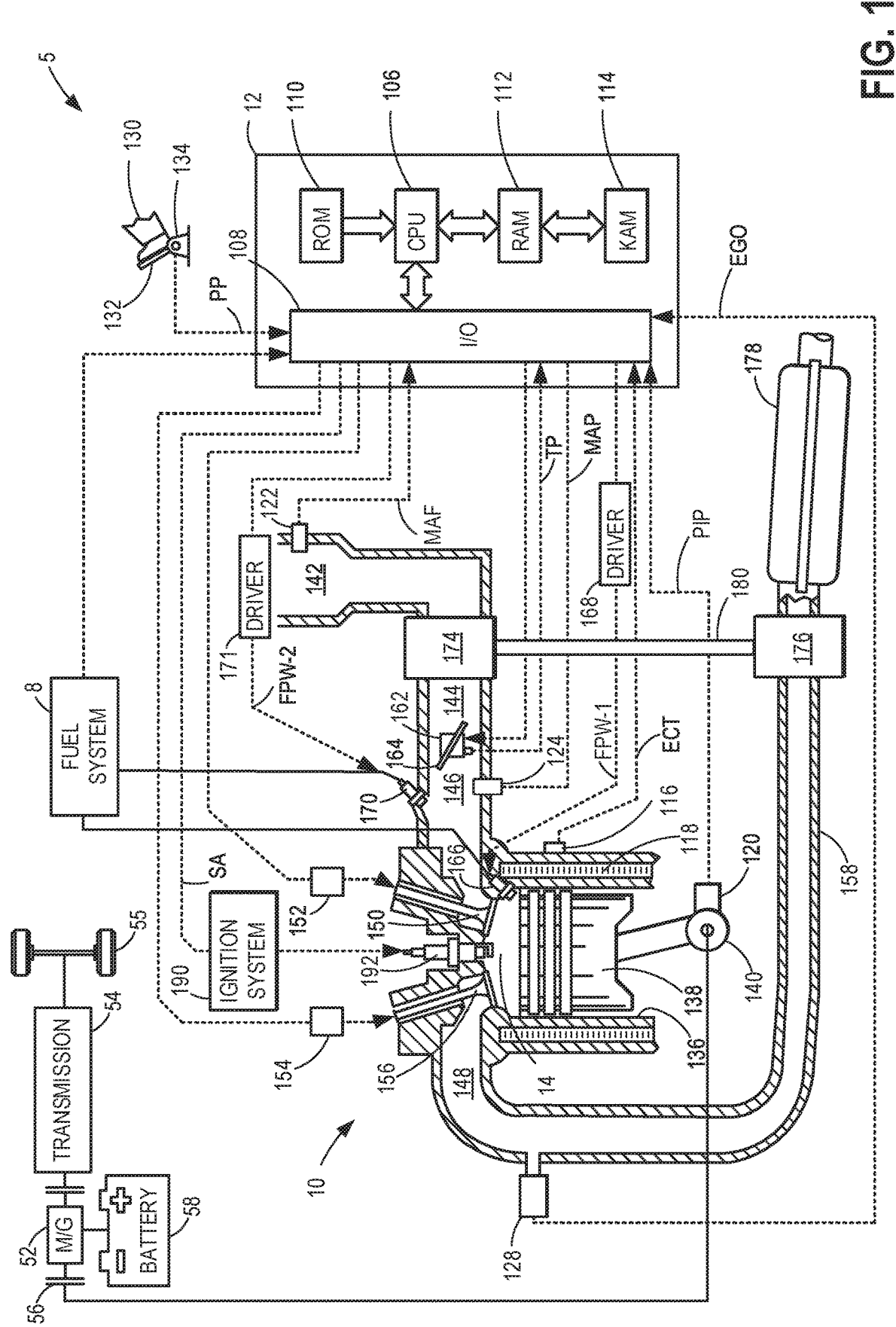
FIG. 1 schematically shows a cylinder of an internal combustion engine of a vehicle.
Figure 2:
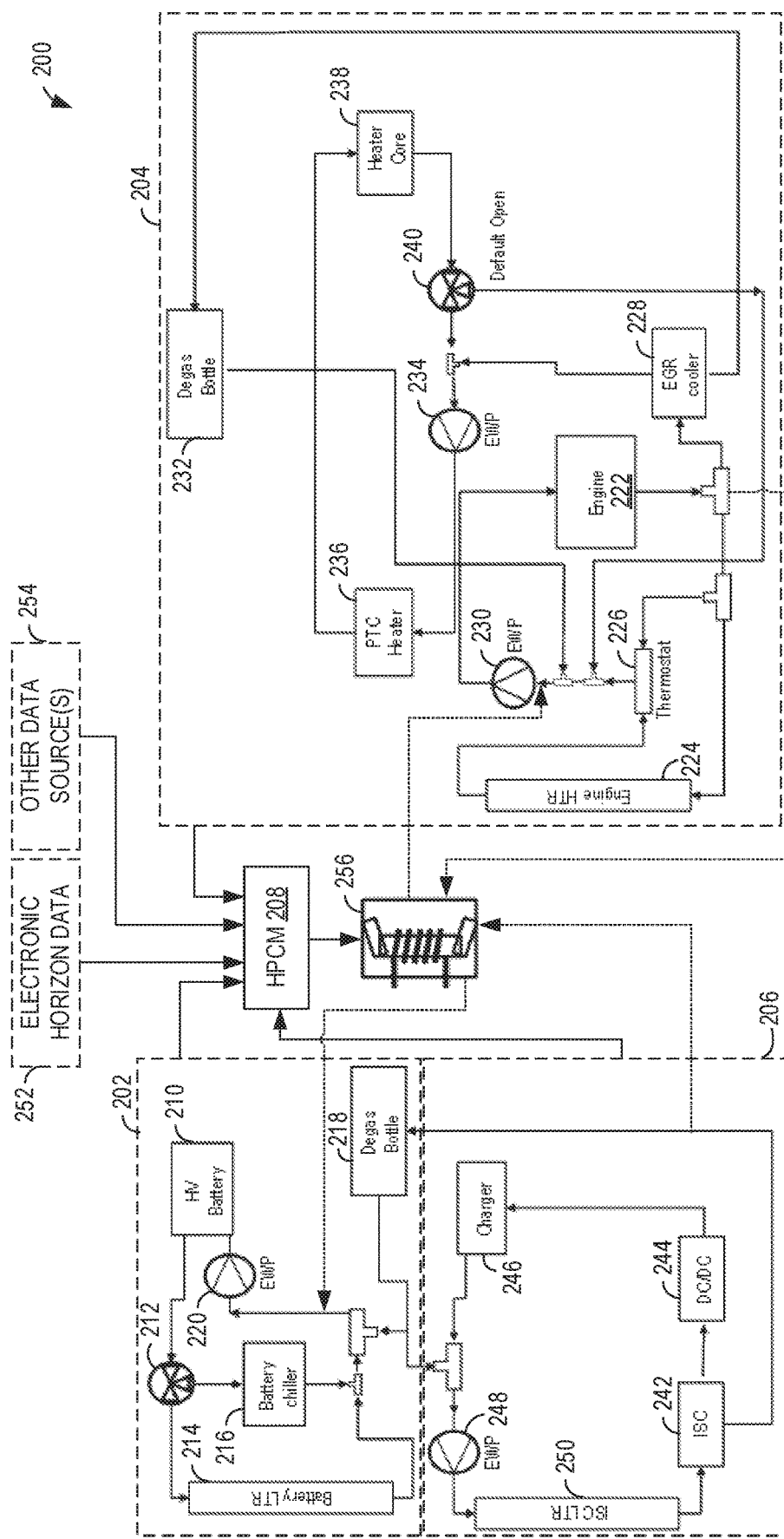
FIG. 2 schematically shows an engine system including a plurality of coolant systems, each coupled to a heat exchanger.

FIG. 1 depicts an example of a combustion chamber or cylinder of internal combustion engine 10 of a vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In the example shown by FIG. 1, the vehicle 5 includes an electric turbocharger 159. Electric turbocharger 159 is configured to deliver compressed intake air to each of the cylinders of the vehicle 5 (e.g., cylinder 14). FIG. 1 shows engine 10 configured with a compressor 174 of the electric turbocharger 159 arranged between intake passages 142 and 144, and an exhaust turbine 176 of the electric turbocharger 159 arranged along exhaust passage 148. Compressor 174 may be at least partially powered by exhaust turbine 176 via a shaft 180 during conditions in which the engine 10 is operating (e.g., the engine 10 is on, and fuel and air are combusted within one or more of the cylinders of the engine 10). However, in some examples, exhaust turbine 176 may be optionally omitted, and compressor 174 may be powered by mechanical input from a motor or the engine. As referred to herein, an electric turbocharger (e.g., electric turbocharger 159) includes at least a compressor configured to deliver compressed air to engine cylinders, and an electric motor (e.g., electric motor 175) configured to drive (e.g., spin) the compressor. The electric turbocharger may further include a turbine (e.g., exhaust turbine 176) configured to be driven by exhaust gases flowing out of the engine 10.

Electric turbocharger 159 includes electric motor 175 coupled to compressor 174. The compressor 174 may be referred to herein as an electrically driven air compressor. Electric motor 175 may be selectively energized by the controller 12 in order to spin the compressor 174 and deliver compressed intake air to the cylinders of the engine 10 (e.g., cylinder 14). For example, the electric motor 175 may be energized by the controller 12 in response to an engine start request (e.g., during the engine start request, while the engine 10 is off and is not combusting fuel/air in engine cylinders) in order to deliver compressed air to the engine cylinders to move pistons disposed within the cylinders (e.g., piston 138) and rotate the crankshaft 140 of the engine 10, without combusting fuel/air within engine cylinders. After moving the pistons via the compressed air, one or more of the engine cylinders may then be provided with fuel (e.g., gasoline, diesel, etc., via fuel injector 166 and/or fuel injector 170) and spark may be initiated within the one or more engine cylinders (e.g., via spark plug 192) to combust fuel/air within the engine cylinders and start the engine 10.

A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2 and 3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature. Coolant temperatures from other coolant systems may also be received at the controller 12.

The controller 12 receives signals from the various sensors of FIG. 1 and employs the various actuators of FIG. 1 to adjust engine operation based on the received signals and instructions stored on a memory of the controller. For example, adjusting a temperature of coolant in one or more coolant systems of the vehicle may include adjusting one or more actuators associated with a centralized heat exchanger between the coolant systems (e.g., where the actuators control valves that allow or block flow of coolant to the centralized heat exchanger based on corresponding positions of the valves) to control thermal exchange between the coolant systems of the vehicle 5. Further examples are described below with reference to FIGS. 3-5.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation. Additional example components that may be included in a hybrid electric vehicle are described below with respect to FIG. 2.

FIG. 2 shows an example system for a vehicle 200 including a battery coolant system 202, an engine coolant system 204, and an inverter system controller (ISC) coolant system 206. The vehicle 200 also includes a hybrid powertrain control module (HPCM) 208, which is schematically illustrated outside of the vehicle systems 202, 204, and 206, but which may in some examples be included in the ISC coolant system 206 or another vehicle system. The vehicle 200 may be an example of vehicle 5 of FIG. 1 and may include one or more of the vehicle components described above with respect to FIG. 1.

The battery coolant system 202 includes a battery 210 (e.g., a high voltage battery), which may include a single battery or an array/bank/plurality of batteries, and which may be configured to serve as a voltage source for powering electrical components of the vehicle 200 (e.g., an electric motor, electrical circuits, an alternator, etc.). Coolant (e.g., liquid coolant, such as water or a water mixture) flows from coolant passages around the battery 210 to a three-way valve 212 that directs the coolant to a battery low temperature radiator 214 and/or a battery chiller 216. For example, the three-way valve 212 may be actuatable (e.g., via a controller of the vehicle) to direct all flow of coolant to the battery low temperature radiator 214 (e.g., bypassing or otherwise not providing coolant to the battery chiller 216) when in a first operating position, to direct all flow of coolant to the battery chiller 216 (e.g., bypassing or otherwise not providing coolant to the battery low temperature radiator 214) when in a second operating position, and to direct portions of the flow of coolant to each of the battery low temperature radiator 214 and the battery chiller 216 simultaneously when in a third operating position.

The battery low temperature radiator 214 may include a heat exchanger for exchanging heat between the coolant entering the radiator and an atmosphere of the vehicle 200. For example, the low temperature radiator 214 may transfer heat from the coolant entering the radiator to atmosphere, thereby cooling the coolant that flows through the radiator. The battery chiller 216 may include a heat exchanger that exchanges heat between the coolant entering the radiator and another medium (e.g., another liquid). In some examples, the low temperature radiator 214 and the battery chiller 216 may have different heat exchange properties and/or capabilities (e.g., may provide for different temperature differentials for coolant entering versus coolant exiting the radiator/chiller) based on static conditions (e.g., size/structure of the radiator/chiller) and/or dynamic conditions (e.g., ambient temperatures). Accordingly, the three-way valve 212 may be controlled to direct a respective amount of coolant flow to each of the battery low temperature radiator 214 and the battery chiller 216 that maintains a target temperature or target temperature range for a combined coolant flow exiting the radiator and chiller. The target temperature and/or target temperature range may be selected to match an ideal temperature or temperature range for operation of the battery 210. The coolant flow exiting the battery low temperature radiator 214 and the battery chiller 216 may be mixed with one another and, optionally (e.g., based on a pressure level of the coolant in the battery coolant system) coolant from a degas bottle 218. The degas bottle 218 may serve as a coolant reservoir and may de-aerate coolant fluid in the system. The mixed coolant flow may be directed to a pump 220 (e.g., an electric water pump) to be pumped back to the coolant passages of the battery 210.

Engine coolant system 204 includes an engine 222, which may include an internal combustion engine for providing power for operating vehicle 200. Coolant (e.g., liquid coolant, such as water or a water mixture) flows from coolant passages around the engine 222 to an engine high temperature radiator 224, a thermostat 226, and an EGR cooler 228. The engine high temperature radiator 224 may include a heat exchanger for exchanging heat between the coolant entering the radiator and an atmosphere of the vehicle 200. For example, the high temperature radiator 224 may transfer heat from the coolant entering the radiator to atmosphere, thereby cooling the coolant that flows through the radiator.

Coolant exiting the high temperature radiator 224 may be provided to the thermostat 226. In this way, the thermostat may be able to control flow of coolant to a pump 230 (e.g., an electric water pump) based on the temperatures of the incoming coolant from the engine 222 and the engine high temperature radiator 224. For example, the thermostat may control the amount of coolant from each of the engine 222 and the engine high temperature radiator 224 that is passed to the pump 230 to achieve a target temperature of coolant passed to the pump 230. In an illustrative example, coolant from the engine 222 may be warmer than coolant from the engine high temperature radiator 224. Accordingly, the thermostat may pass more coolant from the engine 222 than from the high temperature radiator 224 when coolant temperature is to be increased, and the thermostat may pass more coolant from the high temperature radiator 224 than from the engine 222 when coolant temperature is to be decreased.

The EGR cooler 228 may include a heat exchanger configured to exchange heat between (e.g., cool) recirculated exhaust from the vehicle (e.g., in an EGR system) and/or NOx and coolant from the engine coolant system 204 before the exhaust gas is re-introduced to cylinders in the vehicle and/or before emissions are passed to atmosphere. Coolant exiting the EGR cooler 228 may typically be heated relative to the coolant entering the EGR cooler. Coolant exiting the EGR cooler 228 is directed to a degas bottle 232 and to a coolant line upstream of a pump 234 (e.g., an electric water pump). Degas bottle 232 may operate similarly to degas bottle 218 of the battery coolant system 202, and may serve as a coolant reservoir and may de-aerate coolant fluid in the system. The degas bottle 232 may supply de-aerated coolant back into the engine coolant system 204 upstream of pump 230.

Pump 234, which receives (e.g., heated) coolant from the EGR cooler 228, may be a pump for an instant heat coolant circuit that includes a positive temperature coefficient (PTC) heater 236 and a heater core 238. Coolant may be pumped from pump 234 to the PTC heater 236 in order to further heat the coolant. The PTC heater 236 may serve as a supplemental (e.g., electric) heater to provide heat to a cabin of the vehicle 200. For example, the PTC heater 236 may be capable of heating the coolant more quickly than the engine 222 after a start-up event (e.g., before the engine 222 is warmed up). Heated coolant from the PTC heater 236 is directed to the heater core 238, which may include a radiator or radiator-like device configured to exchange heat between the heated coolant and air in the cabin. For example, the heater core 238 may include a series of winding tubes, through which the coolant flows, and a plurality of fins, that increase a surface area for heat transfer from the coolant in the tubes to air that is forced past the fins (e.g., by a fan that is part of the cabin heating, ventilation, and air conditioning system) toward vents leading to the cabin of the vehicle 200.

Coolant exiting the heater core 238 (e.g., which may typically be cooler than coolant entering the heater core due to a transfer of heat from the coolant to cabin air) is provided to a three-way valve 240, which is shown in FIG. 2 in a default open position, in which coolant is directed from the heater core 238 back to pump 234 (mixing with coolant exiting the EGR cooler 228) for recirculation back to PTC heater 236 and to pump 230 (mixing with coolant from the degas bottle 232 and from the thermostat 226) for recirculation back to engine 222. The three-way valve 240 may be actuatable (e.g., via a controller) to different positions, which respectively direct coolant from the heater core 238 to bypass pump 230 (e.g., where all coolant is supplied to pump 234) or to bypass pump 234 (e.g., where all coolant is supplied to pump 230). Control of the position of the three-way valve 240 may be based on parameters such as a target temperature for coolant in various regions of the engine coolant system 204 and a current temperature for coolant in various regions of the engine coolant system 204 (e.g., to increase or decrease temperature of the coolant to reach the target temperature for a given region of the engine coolant system).

ISC coolant system 206 includes components of an electrical drivetrain system of the vehicle 200 including an inverter system controller (ISC) 242, a direct current (DC)-to-DC converter 244, and a charger 246. The ISC 242 may convert alternating current generated by an electric machine (e.g., a motor, motor/generator, starter/generator, etc. for the vehicle 200) to direct current for storage at an electrical energy storage device (e.g., battery 210) and vice versa. For example, the ISC 242 may convert the alternating current to direct current for charging the battery 210 and/or may convert direct current from the battery 210 to alternating current and/or otherwise supply alternating current to an electric machine (e.g., a motor for propelling the vehicle 200). The charger 246 may convert alternating current from a power source (e.g., a power source external from the vehicle 200, such as a power grid) to direct current for storage at battery 210 (e.g., to charge battery 210). The DC-to-DC converter 244 may convert a source of direct current from the charger 246 from one voltage to another voltage (e.g., to provide a voltage source for electrical components of the vehicle 200 that are configured for a different voltage than the output voltage of the charger 246).

Coolant from the degas bottle 218 may be provided to a pump 248 (e.g., an electric water pump), which pumps the coolant into an ISC low temperature radiator 250. The ISC low temperature radiator 250 may include a heat exchanger for exchanging heat between the coolant entering the radiator and an atmosphere of the vehicle 200. For example, the low temperature radiator 250 may transfer heat from the coolant entering the radiator to atmosphere, thereby cooling the coolant that flows through the radiator. Coolant exiting the ISC low temperature radiator 250 is directed to the ISC 242 (e.g., to cool the ISC 242 and/or to maintain the ISC 242 within a target temperature range that is set in accordance with an ideal operating temperature range for the ISC 242). Coolant exiting coolant passages for the ISC 242 is directed to the DC-to-DC converter 244 and the degas bottle 218. Coolant exiting coolant passages for the DC-to-DC converter 244 is directed to the charger 246. Coolant exiting coolant passages for the charger 246 is provided to the pump 248 (e.g., mixed with any coolant provided from the degas bottle 218) to be returned to the ISC low temperature radiator 250.

The HPCM 208 may receive data from each of the battery coolant system 202, the engine coolant system 204, and the ISC coolant system 206, as well as from other sources, such as an electronic horizon data source 252 and/or other data sources 254, in order to control a heat exchanger 256. For example, the HPCM 208 may receive data from the battery coolant system 202 (e.g., from one or more sensors and/or other devices in the battery coolant system) indicating a state of charge of the battery, a charging status of the battery (e.g., whether or not/how long the vehicle is plugged in to a power source to charge the battery), a temperature of coolant in one or more locations of the battery coolant system, a pressure drop of coolant in the battery coolant system, and/or other information regarding the battery coolant system and/or associated components. The HPCM 208 may receive data from the engine coolant system 204 indicating an operating state of the engine, a temperature and/or pressure drop of coolant in one or more locations of the engine, and/or other information regarding the engine coolant system and/or associated components. The HPCM 208 may receive data from the ISC coolant system 206 indicating an operating state of the ISC 242, DC-to-DC converter 244, and/or charger 246, a temperature and/or pressure drop of coolant in one or more locations of the ISC coolant system, and/or other information regarding the ISC coolant system and/or associated components. The HPCM 208 may receive data from the electronic horizon data source 252 (e.g., directly or via a bus, such as a controller area network (CAN) bus of the vehicle 200) indicating map-derived road or route attributes, including geo coded data, semantic coded data, road slope information, route traffic information, road turn radius information, elevation information, road attributes such as stop signs, roundabouts, pedestrian crossings, road type, number of lanes, road dimensions, traffic light signals along a route, etc., weather, and/or other information regarding a road ahead of the vehicle 200 and/or along a route that the vehicle 200 is travelling. For example, the electronic horizon data source 252 may provide an extended view (e.g., relative to information provided to one or more vehicle-mounted sensors) on the surroundings of the vehicle 200, using information from a plurality of remote data sources regarding features of the surroundings of the vehicle (e.g., based on a location of the vehicle as reported by on-board sensors of the vehicle, such as global positioning system (GPS) sensors, accelerometers, gyroscopes, etc.). The Electronic horizon data source may include and/or be in communication with a computing system that is configured to translate map information with detailed road characteristics (e.g., based on information received from one or more sources, such as vehicle sensors, infrastructure sensors, user entry, road information databases, etc.) into actionable data for automatic driver assistance systems and autonomous driving applications, thereby increasing reliability of the systems and applications and extending the range of awareness of the systems and applications.

The HPCM 208 may receive other data from the electronic horizon data source 252 and/or other data sources 254 (e.g., directly or via a bus, such as the CAN bus of the vehicle), such as live traffic information, traffic light sequence information, origin and destination data for a planned route of travel for the vehicle, way points along the planned route, time to a target along the route, road load and drive event estimation, wheel power/torque request estimation, vehicle mode of operation estimation along the planned route, sensor data including powertrain control module (PCM) estimations such as drive line torque estimations, engine mode estimations, etc., and/or other information indicating a current vehicle status, dynamic conditions around a vehicle, and/or predicted conditions/states associated with the vehicle and/or a planned route of the vehicle. The HPCM 208 may generate a thermal blending heat exchanger scheduling strategy based on the data received from the various sources described above.

The HPCM 208 may provide instructions to the heat exchanger 256 and/or a controller associated with the heat exchanger 256 to direct coolant flow between the battery coolant system 202, the engine coolant system 204, and the ISC coolant system 206 in accordance with the thermal blending heat exchanger scheduling strategy. For example, the heat exchanger 256 may be configured to receive coolant from one or more locations within the battery coolant system 202, the engine coolant system 204, and the ISC coolant system 206, and to direct flow of coolant to one or more locations within the battery coolant system 202, the engine coolant system 204, and the ISC coolant system 206.

The connections illustrated in FIG. 2 show example locations at which the heat exchanger may be fluidically coupled to the battery coolant system 202, the engine coolant system 204, and the ISC coolant system 206. For example, the heat exchanger 256 is illustrated as receiving coolant from a location between the ISC 242 and the degas bottle 218 (e.g., downstream from the ISC 242 and upstream of the degas bottle 218) and from a location between the engine 222 and the EGR cooler 228/thermostat 226/engine high temperature radiator 224 (e.g., downstream from the engine 222 and upstream of the EGR cooler 228, thermostat 226, and engine high temperature radiator 224). The heat exchanger 256 is also illustrated as directing coolant flow (e.g., from one or more of the locations from which the heat exchanger 256 receives coolant) to a location between the thermostat 226 and the pump 230 (e.g., downstream from the thermostat 226 and upstream of the pump 230) and to a location between the degas bottle 218/battery chiller 216/battery low temperature radiator 214 and the pump 220 (e.g., downstream from the degas bottle 218, battery chiller 216, and battery low temperature radiator 214 and upstream from the pump 220). However, it is to be understood that more, fewer, and/or different connections may be made between the heat exchanger 256, the battery coolant system 202, the engine coolant system 204, and the ISC coolant system 206.

In some examples, the heat exchanger 256 may be configured to mix coolant from one or more locations and/or to exchange heat between coolant from one or more locations and an atmosphere or other medium in order to adjust a temperature of the coolant in accordance with the thermal blending heat exchanger scheduling strategy.

In other examples, the heat exchanger 256 may utilize first coolant from one or more locations as a heat exchange medium for changing a temperature of second coolant in another location (e.g., without directing the first coolant to a different coolant system). In a non-limiting example of such an approach, coolant may be directed from a location in the engine coolant system 204 to the heat exchanger 256 (e.g., to a first inlet of the heat exchanger) and then back to the engine coolant system 204 (e.g., to a same location or to a different location in the engine coolant system). Coolant may also be directed from a location in the battery coolant system 202 to the heat exchanger 256 (e.g., to a second, different inlet of the heat exchanger) and then back to the battery coolant system 202 (e.g., to a same location or to a different location in the battery coolant system). The coolant from the engine coolant system 204 that flows through the heat exchanger 256 may be a different temperature than the coolant from the battery coolant system 202 (e.g., hotter or colder), and may be used to change the temperature of the coolant from the battery coolant system 202 (e.g., increase or decrease the temperature) flowing through the heat exchanger 256 before reintroducing the coolant from the battery coolant system back to the battery coolant system. As a result of the heat exchange, the temperature of the coolant from the engine coolant system 204 may also be changed (e.g., decreased or increased) before reintroducing the coolant from the engine coolant system back to the engine coolant system.

In the above example, coolant that is directed to the heat exchanger may bypass some elements of a respective coolant system. For example, coolant may be controlled to be flowed from downstream of the ISC 242 and upstream of the degas bottle 218 into the heat exchanger 256, then to the pump 220 (e.g., downstream of the battery low temperature radiator 214 and the battery chiller 216 and upstream of the pump 220), thereby bypassing the remainder of the ISC coolant system 206. In this way, coolant that is, for example, heated in the heat exchanger 256 (e.g., via hot coolant from the engine system) may be provided to the battery 210 via the pump 220 without being cooled by other components in the coolant systems. Likewise, coolant from the engine coolant system 204 may be directed from upstream of the engine high temperature radiator 224 and thermostat 226 and downstream of the engine 222, to the heat exchanger 256, then to a location upstream the pump 230 and downstream the engine high temperature radiator 224 and thermostat 226, thereby bypassing the engine high temperature radiator and thermostat. In some examples, the control of the heat exchanger 256 according to a schedule may include controlling the flow of coolant by actuating valves positioned between the coolant systems 202, 204, and 206 and the heat exchanger 256.

In examples where additional connections between the heat exchanger 256 and the coolant systems are provided, the actuation of valves may provide control over the type of heat exchange performed via the heat exchanger 256. For example, the illustrated connection showing the flow from the ISC coolant system 206 to the heat exchanger 256 and then to the battery coolant system 202 may be utilized to provide hot coolant from the engine coolant system 204 to heat the battery 210 or to provide hot coolant from the ISC 242 to the engine coolant system 204 to warm up the engine 222. In other conditions, where hot coolant from the battery 210 is to be provided to the heat exchanger 256 to warm up the engine 222 via coolant in the engine coolant system 204 that is flowed through the heat exchanger, the controller may actuate valves to connect a coolant line (not shown) from downstream the battery 210 and upstream the three-way valve 212 to the heat exchanger 256 (e.g., and then to a location downstream of the battery low temperature radiator 214). In any of the above examples, each of the coolant systems may be thermally isolated from one another via one or more valves controlling flow of coolant to and from the heat exchanger. Accordingly, coolant from each of the coolant systems may not exchange heat with coolant from any of the other coolant systems except during conditions where coolant from the respective coolant systems is flowed through the centralized heat exchanger 256.

Figure 3:
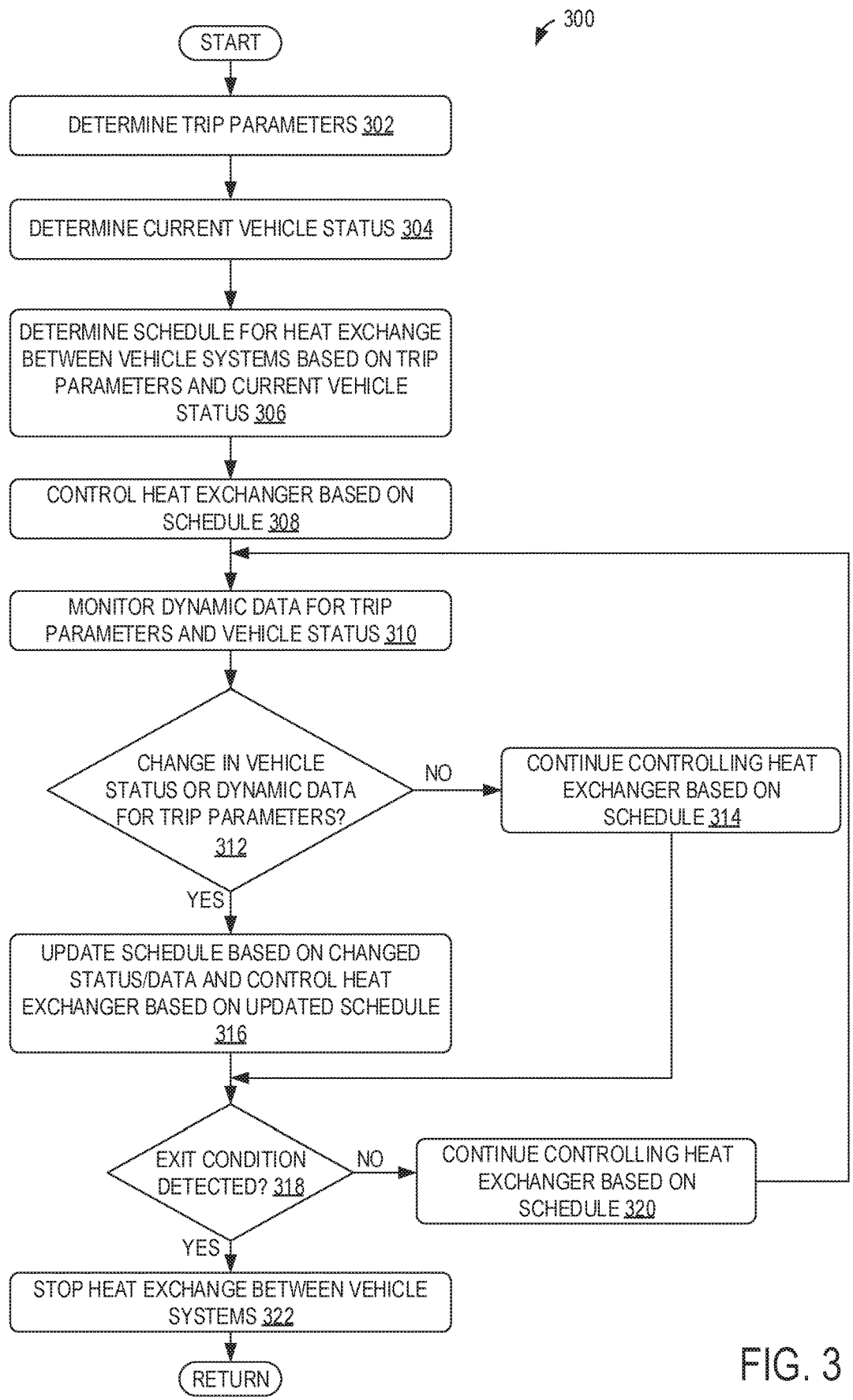
FIG. 3 illustrates a method for controlling heat exchange between coolant systems of a vehicle.

An example method 300 of controlling thermal blending between systems of a vehicle (e.g., controlling a heat exchanger, such as heat exchanger 256 of vehicle 200 of FIG. 2) is provided in FIG. 3. Instructions for carrying out method 300 and the rest of the methods included herein may be executed by a controller based on instructions stored on a memory of the controller and in conjunction with signals received from sensors of a vehicle and/or engine system, such as the sensors described above with reference to FIG. 1. The controller may employ engine actuators of the vehicle and/or engine system to adjust vehicle and/or engine operation, according to the methods described below.

Method 300 may be entered responsive to an engine/vehicle start up condition, a vehicle entrance condition (e.g., detecting a door open/unlock event), and/or another entrance condition for starting a thermal blending control scheme. At 302, the method includes determining trip parameters for a vehicle trip, which may be used in a feedforward loop for control of the thermal exchange between vehicle systems. For example, trip parameters may include detected and/or estimated/predicted conditions of the vehicle as well as constraints relating to the vehicle trip. Example data relating to parameters of the vehicle trip may include origin and destination data for the trip, way points along the way of the trip (e.g., including scheduled stops along the trip and/or points of interest along the trip), desired or predicted time to a target (e.g., the destination, one or more of the waypoints, and/or one or more locations along the trip), and/or other information. In light of the parameters of the vehicle trip, the controller may receive and/or determine associated dynamic and fixed data for the vehicle trip.

Example dynamic data, which may be determined by information from sensors on the vehicle and/or real-time or near-real-time data received from third-party sources (e.g., other vehicles, server systems, cloud computing devices, etc.) includes live traffic information, traffic light sequence information (e.g., timing of traffic lights, current status of traffic lights, etc. for traffic lights along one or more routes for the vehicle trip), weather information (e.g., ambient temperature, humidity, precipitation, cloud cover/sun load on the vehicle, etc.), object/pedestrian detection, driver/occupant state (e.g., whether the driver is distracted, which may lead to erratic driving behaviors), and/or other features of the environment of the vehicle that may affect the operation of the vehicle. Fixed data may include data that is relatively stagnant (e.g., compared to the dynamic data described above) and/or is updated in non-real-time. The fixed data may be received from an electronic horizon data source (e.g., electronic horizon data source 252 of FIG. 2) and/or via another source, such as on-board sensors of the vehicle, local data storage of the vehicle, remote data storage (e.g., servers, cloud computing systems, etc.) in communication with the vehicle, etc. Fixed data may include road attribute information for one or more roads of a route for the vehicle (e.g., elevation, condition, type [e.g., gravel, asphalt, concrete, dirt, etc.], number of lanes, dimensions, turn radius, stop sign distribution, traffic light distribution, pedestrian crossing distribution, roundabout distribution, other traffic management features, etc.), historical/average amount/type (e.g., two-wheeled, four-wheeled, commercial vehicle, semi-truck/tractor-trailer, bike, etc.) of traffic along the route of the vehicle, historical or predicted weather along the route of the vehicle, construction status for the route of the vehicle, historical driver/occupant information (e.g., driver habits/historical behaviors), and/or other information.

At 304, the method includes determining a current vehicle status. The current vehicle status may be used in a feedback loop for control of the thermal exchange between vehicle systems. For example, the thermal exchange between vehicle systems may affect the current vehicle status, and the changes resulting from the control of the thermal exchange may be fed back to the controller in order to make further adjustments to the thermal exchange. The current vehicle status may be determined using information from one or more vehicle-mounted sensors (e.g., as received at the controller from the sensors via the CAN bus or other communication link in the vehicle) and/or from other sources, such as a mobile device inside of the vehicle (e.g., a smartphone or other mobile device of a driver or passenger in the vehicle), a third-party device (e.g., a sensor mounted on another vehicle, a pedestrian mobile device, a traffic camera or other infrastructure-based sensor, etc.) monitoring the vehicle, and/or any other suitable source. The current vehicle status may be determined using information such as a charge state of a battery of the vehicle, battery coolant temperature, pressure drop across one or more locations within the vehicle systems (e.g., within one or more of the coolant systems of the vehicle), a power control module estimation such as a drive line torque estimation, engine mode, etc., and/or other information indicating a current state of the vehicle.

At 306, the method includes determining a schedule for heat exchange between vehicle systems based on the trip parameters determined at 302 and the current vehicle status determined at 304. For example, the controller may make a logical determination (e.g., regarding a control of a heat exchanger and/or associated actuations of valves controlling the flow of coolant to the heat exchanger) based on logic rules that are a function of the trip parameters to derive a road load and drive event estimation (e.g., to determine conditions predicted to be experienced along the route of the vehicle trip). As a more detailed, non-limiting example, the controller of the vehicle may match one or more of the trip parameters to one or more conditions indicating road load and/or drive events using one or more predetermined look-up tables, models, and/or other algorithms that are stored/executed locally and/or remotely from the controller. In some examples, machine-learning algorithms (e.g., deep learning algorithms) such as random forest, neural networking, or other training mechanisms may be used to map trip parameters to road load and/or drive event estimation. Vehicle operation changes that may result from the estimated road load and drive events may be determined using further look-up tables, models, and/or other (e.g., machine-learning) algorithms. For example, the controller may estimate wheel power/torque request and/or vehicle modes of operation that are predicted for the estimated road load and drive events. The vehicle operation changes may then be applied to a battery operation model to determine a charge status and battery coolant temperature estimation for the battery and associated battery coolant system (e.g., battery coolant system 202 of FIG. 2) of the vehicle during the estimated vehicle operation changes that result from the estimated road load and drive events. The estimations described above may further be used to estimate coolant temperature in other coolant systems of the vehicle, such as an ISC coolant system (e.g., ISC coolant system 206 of FIG. 2) and an engine coolant system (e.g., engine coolant system 204 of FIG. 2). The estimated coolant temperatures and/or other estimated/derived conditions described above may be used alongside the current vehicle status information in order to provide the thermal blending heat exchanger scheduling strategy.

For example, the thermal blending heat exchanger scheduling strategy may include instructions to route coolant from one or more selected coolant systems to a centralized heat exchanger (e.g., heat exchanger 256 of FIG. 2) at different times/locations along a route of a vehicle trip in order to exchange heat between the selected coolant systems. Accordingly, as indicated at 308, the method further includes controlling the heat exchanger based on the schedule. For example, the controller may send instructions to the heat exchanger according to the schedule upon reaching a time/location associated with a change in the heat exchanger operation. Accordingly, the controller may use current vehicle status information based on a first set of signals (e.g., information from a GPS sensor indicating a location of the vehicle) to determine which instructions to apply to the heat exchanger, where the instructions are derived based on a second set of signals (e.g., signals from vehicle sensors and/or other sources indicating fixed or dynamic data for trip parameters and/or current vehicle status as described above). The schedule for controlling the heat exchanger may include instructions from the controller to actuate one or more valves and/or other elements to direct coolant flow through the heat exchanger and/or between coolant systems.

At 310, the method includes monitoring dynamic data for the trip parameter and vehicle status. For example, as described above, the schedule may be initially determined based on estimations for a vehicle trip. However, real-time conditions may be used to continuously fine-tune the estimations and/or generate new estimations (e.g., if the vehicle encounters unpredictable conditions and/or is operated in a different manner than expected) that change the schedule for thermal exchange between coolant systems of the vehicle. At 312, the method includes determining if a change in vehicle status or dynamic data for the trip parameters is detected. In some examples, the change may be detected at 312 if the change is above a threshold at which the schedule is to be changed. For example, the schedule may be derived based on estimations that are valid for a range of operating conditions, however, if the change in vehicle status or dynamic data indicates an operating condition outside of the range, a new estimation may be performed, which may change the thermal exchange strategy. Accordingly, if the change in vehicle status or dynamic data is not identified (and/or is below an associated threshold, e.g., "NO" at 312), the method includes continuing to control the heat exchanger based on the schedule determined at 306, as indicated at 314. If the change in vehicle status or dynamic data is identified (and/or is above an associated threshold, e.g., "YES" at 312), the method includes updating the schedule based on the changed status and/or data and controlling the heat exchanger based on the updated schedule, as indicated at 316.

At 318, the method includes determining if an exit condition is detected. For example, an exit condition may include a vehicle shut down or shut off event (e.g., key off, gear shift into park, door open event, etc.), an elapsed time that is greater than a threshold, a vehicle location (e.g., a home of the driver, a destination of a vehicle trip, etc.), a user input requesting to exit the thermal exchange schedule, etc. If the exit condition is not detected (e.g., "NO" at 318), the method includes continuing to control the heat exchanger based on the schedule (e.g., the updated schedule if the schedule is updated at 316 or the schedule derived at 308 if the schedule is not updated according to 314), as indicated at 320, and returning to continue monitoring the dynamic data at 310. If the exit condition is detected (e.g., "YES" at 318), the method includes stopping the heat exchange between vehicle systems according to the schedule, as indicated at 322, and returning (e.g., returning to wait for an entrance condition for restarting a thermal exchange process according to method 300). Stopping the heat exchange between vehicle systems may include instructing one or more actuators and/or valves to return to a default state and/or to stop the flow of coolant to/from the centralized heat exchanger.

FIGS. 4 and 5 show example graphical representations of example, non-limiting scenarios for controlling a heat exchanger under different example vehicle conditions. The conditions and operations of FIGS. 4 and 5 may relate to the control of a vehicle, such as vehicle 200 of FIG. 2, according to a heat exchange control method, such as method 300 of FIG. 3, to control the exchange of heat between different coolant systems in the vehicle. FIG. 4 shows a timeline 400 that relates to a scenario for a vehicle trip in which ambient temperature of the vehicle may be cold (e.g., below a threshold, such as below 50° F.) and in which a battery of the vehicle is plugged in overnight before the vehicle trip is started (e.g., the vehicle starts the trip at a stationary location where the vehicle has been plugged in overnight). The battery state of charge may be high (e.g., above a threshold, such as above 75% charged or above 95% charged) and the battery temperature may be warm from being plugged in overnight (e.g., above a threshold temperature, such as above 70° F. or above the ambient temperature of the vehicle).

Accordingly, as shown in FIG. 4, at time T0, a road load 402 is at a minimum level, since the vehicle is just starting a trip and not encountering road features. A cabin temperature 404 at time T0 is relatively low (e.g., around 27° F.), in light of the low ambient temperature of the vehicle. An engine mode 406 is off and a battery mode 408 is on at time T0, as the vehicle is started using only power from the battery and not from the engine. A battery coolant temperature 410 (e.g., measured via a temperature sensor located in the battery coolant system of the vehicle) at time T0 is relatively high (e.g., close to an optimum operating temperature 412; closer to the optimum operating temperature 412 than to ambient temperature 414) while the engine coolant temperature 416 (e.g., measured via a temperature sensor located in the engine coolant system of the vehicle) at time T0 is relatively low (e.g., lower than the battery coolant temperature; approximately equal to ambient temperature 414). It is to be understood that although a single optimum operating temperature 412 is represented in the timeline 400, the optimum operating temperature 412 may represent different temperatures for the battery coolant system and the engine coolant system.

The strategy for controlling heat exchange between vehicle systems in the scenario of FIG. 4 may relate to the starting parameters described above in combination with predicted road load based on electronic horizon data and/or other data sources, as described above with respect to FIG. 3, for example. In the illustrated example, the heat exchanger may be operated to provide preconditioning and/ or heating up of engine coolant with excess heat available from the battery and ISC coolant loop before engine pull up as estimated by trip parameter data, such as electronic horizon data. In this way, the preconditioning of engine coolant may reduce fuel penalties (e.g., due to cold start spark retard), cold engine friction and associated torque loss, and open loop fueling, which are dependent upon engine coolant temperature. Accordingly, a heat exchanger mode 418 may be off at time T0 in order to allow the battery coolant temperature 410 to continue to heat up as much as possible until just before the engine is predicted to be started up. For example, the electronic horizon data may predict an increase in road load between time T2 and T3 that will result in a startup of the engine to supplement power provided by the battery to propel the vehicle (e.g., an increase in road load to above a threshold $RL_{TH}$). Accordingly, in preparation for this engine startup, the heat exchanger mode is switched on at time T1 (e.g., prior to time T2) in order to exchange heat between the battery coolant system and the engine coolant system for warming up the coolant in the engine coolant system. The heat exchanger may be controlled to maintain a battery coolant temperature around optimum temperature 412, while directing excess heat to the engine coolant system, thereby increasing the temperature of the engine coolant system as shown between time T1 and time T2. The cabin temperature 404 may be raised to a target temperature (e.g., 70° F. in the illustrated example) prior to time T1 using heat from the battery coolant system and/or using heat from an instant heater powered by the battery or another auxiliary power source, as described with respect to FIG. 2 above.

At time T2, the engine mode is switched on in preparation for the spike in road load seen between time T2 and T3, and the heat exchange mode is switched back off, since the engine will be able to provide heat to the coolant in the engine coolant system. As shown, the heat exchange mode may be switched off just before the engine mode is switched on in order to prevent overheating of the coolant in the engine and/or battery coolant system in light of the two sources of heat (e.g., the battery and the engine) at time T2. Accordingly, the rise in engine coolant temperature between time T2 and T3 is due to the heat provided to the coolant from the running engine and not from the battery coolant system. At time T3, the road load may be decreasing, and may be predicted to stay below a threshold at which engine operation is triggered to propel the vehicle. Accordingly, at time T3, the engine mode is switched off and the heat exchanger mode is switched back on to allow for the exchange of heat between the engine coolant system and the battery coolant system in order to maintain both systems near the optimum temperature 412. Between time T4 and time T5, another increase in road load may be predicted, to occur which may be larger than the road load predicted and/or observed between time T2 and time T3. The magnitude of the road load may be large enough to trigger the engine to be the sole provider of power for propelling the vehicle, accordingly, at time T4, the engine mode is switched on and the battery mode is switched off. In preparation for this switch, just prior to time T4, the heat exchanger mode is switched off (e.g., to prevent the coolant in the engine system from losing heat to the coolant in the battery system, since the battery will no longer be heating the coolant in the battery system). As the battery is no longer heating the coolant in the battery coolant system, the battery coolant temperature 410 decreases between time T4 and T5, while the engine coolant temperature 416 increases and/or is maintained around the optimum temperature 412.

At time T5, the road load may decrease and/or may be predicted to decrease to below a threshold, and the engine mode may be switched off and the battery mode switched on to conserve fuel. Accordingly, at time T5, the battery coolant temperature may increase and be maintained around the optimum temperature 412 due to the heat generated from operation of the battery.

FIG. 5 shows a timeline 500 that relates to a scenario for a vehicle trip in which ambient temperature of the vehicle may be cold (e.g., below a threshold, such as below 50° F.) and in which a battery of the vehicle has a high state of charge (e.g., above a threshold, such as 75% or 95%) but a low starting temperature (e.g., the battery was plugged in to charge up, but then unplugged long enough to lower the temperature of the battery to be around an ambient temperature). Accordingly, as shown in FIG. 5, at time T0, a road load 502 is at a minimum level. A cabin temperature 504 at time T0 is relatively low (e.g., around 27° F.), in light of the low ambient temperature of the vehicle. An engine mode 506 is on and a battery mode 508 is off at time T0. A battery coolant temperature 510 (e.g., measured via a temperature sensor located in the battery coolant system of the vehicle) at time T0 is relatively low (e.g., farther from an optimum operating temperature 512 than from an ambient temperature 514; approximately equal to the ambient temperature 514). The engine coolant temperature 516 (e.g., measured via a temperature sensor located in the engine coolant system of the vehicle) at time T0 is also relatively low (e.g., approximately equal to ambient temperature 514). It is to be understood that although a single optimum operating temperature 512 is represented in the timeline 500, the optimum operating temperature 512 may represent different temperatures for the battery coolant system and the engine coolant system.

The strategy for controlling heat exchange between vehicle systems in the scenario of FIG. 5 may relate to the starting parameters described above in combination with predicted road load based on electronic horizon data and/or other data sources, as described above with respect to FIG. 3, for example. In the illustrated example, the heat exchanger may be operated to provide preconditioning of battery coolant temperature utilizing excess heat from the engine coolant loop before an electric vehicle mode is entered as estimated by electronic horizon data (e.g., predicting an entrance of the vehicle to a geo-fenced zone in which operating an engine of the vehicle is prohibited). The heat exchange control used for the scenario of FIG. 5 may increase electric vehicle mode efficiency by using the "free" heat from the engine (which would otherwise be vented to atmosphere) to heat up the battery coolant toward an optimum operating temperature (e.g., the battery may drain more slowly at the optimum operating temperature relative to temperatures below the optimum operating temperature).

Accordingly, the heat exchanger mode may be off at time T0, until time T1, where the heat exchanger mode is switched on to allow excess heat from the engine coolant system to be used to heat up the coolant from the battery coolant system in preparation for entrance to the geo-fenced zone, which is predicted to occur at time T2. Although the battery remains off at time T2, the battery coolant temperature increases due to the exchange of heat with the engine coolant system while the heat exchanger mode is on. The cabin temperature 504 may be raised to a target temperature (e.g., 70° F. in the illustrated example) prior to time T1 using heat from the battery coolant system and/or using heat from an instant heater powered by the battery or another auxiliary power source, as described with respect to FIG. 2 above.

The heat exchanger mode 518 may be switched off just before time T2 (e.g., just before the vehicle is predicted to enter the geo-fenced zone and/or responsive to the battery coolant temperature reaching or being maintained around the optimum operating temperature 512) in order to prevent overheating of the battery coolant temperature. At time T2, the engine mode 506 is switched off and the battery mode 508 is switched on responsive to the vehicle entering the geo-fenced zone in which engine operation is prohibited. As a result, the engine coolant temperature 516 drops after time T2, since the engine is no longer providing heat to heat up the coolant. The heat exchanger mode 518 may remain off in order to maintain heat in the battery coolant system, since the engine coolant system has no use for the heat while in the geo-fenced zone. It is to be understood that the heat exchanger mode may be switched on at some point after time T2, if the vehicle is predicted to leave the geo-fenced zone and restart the engine (e.g., based on engine horizon data and vehicle trip data), in order to pre-condition/heat up the coolant in the engine coolant system before engine pull up as described above with respect to FIG. 4. As discussed above, in the scenarios of FIGS. 4 and 5, heat may be exchanged between the engine coolant system and the battery coolant system in order to increase or decrease the associated coolant in the systems in light of predicted conditions of the vehicle. It is to be understood that heat provided to the engine in the scenario of FIG. 4 may also be provided from an ISC coolant system of the vehicle (e.g., ISC coolant system 206 of FIG. 2) and heat provided from the engine in the scenario of FIG. 5 may also be provided to the ISC coolant system in order to control the temperature of coolant in the ISC coolant system similarly to the temperature of the coolant in the battery coolant system.

In another example, cabin temperature may be managed by controlling a heat exchanger mode. For example, excess heat from the ISC coolant system, battery coolant system, and/or engine coolant system may be directed to the cabin (e.g., once the cabin has been heated up to a desired temperature using the engine and/or instant heater) based on operating conditions of the vehicle. An example condition may include the remaining distance of a vehicle trip based on electronic horizon data. If the electronic horizon data indicates that the remaining distance of the vehicle trip may lead to primary usage of the battery for propelling the vehicle and excess heat in the battery and ISC coolant loops, the excess heat from the battery coolant system and the ISC coolant system may be provided to a cabin heating system (e.g., to coolant flow in a heater core, such as heater core 238 of FIG. 2) via the centralized heat exchanger in order to maintain a target cabin temperature instead of (or in addition to) using an instant heater and/or the engine. The above control may increase electric vehicle range due to reduced instant heater usage (e.g., where the instant heater uses the battery thereby reducing battery state of charge) and reducing instances where engine pull up is engaged solely to increase cabin temperature (e.g., thereby increasing fuel economy).

In this way, the methods and systems of this disclosure utilize a central heat exchanger in addition to local heat exchangers of the coolant systems of the vehicle to control thermal management throughout the vehicle in a coordinated manner using a thermal management schedule. For example, by utilizing a combined feedforward control loop (e.g., in which vehicle and vehicle trip parameters are used to derive expected conditions for the vehicle indicating estimated coolant temperatures for different coolant systems of the vehicle) and feedback control loop (e.g., in which dynamic vehicle status information is continuously monitored provide information regarding actual coolant temperatures and operation characteristics of the vehicle) to control coolant flow through the centralized heat exchanger, coolant in multiple vehicle systems may be heated or cooled in anticipation of upcoming events that may change the coolant temperature and/or heating/cooling load of the vehicle components. A technical effect of controlling a heat exchanger according to a thermal management schedule as described herein is that vehicle efficiency may be increased by pre-emptively heating/cooling vehicle components thereby increasing a time at which the vehicle components are operated at ideal temperatures (e.g., temperatures at which the components operate most efficiently) relative to other systems that provide only reactionary thermal management. Another technical effect of controlling the heat exchanger as described herein is that energy consumption is reduced relative to other systems that are not capable of routing excess heat between coolant systems. For example, heating engine coolant with excess heat from a battery and/or ISC coolant system(s) before the engine is started enables the engine to be warm-started, which may consume less fuel than a cold start. Furthermore, as described above, excess heat from a battery and/or ISC coolant system(s) may be provided to heat a cabin instead of using an auxiliary instant heater, thereby reducing battery discharge associated with operating the instant heater and/or reducing fuel consumption associated with operating the engine solely to provide heat for the cabin heating system.

The disclosure provides for a method for controlling a heat exchanger in a vehicle, the method including controlling a flow of coolant from each of a first coolant system and a second coolant system through the heat exchanger based on an estimated coolant temperature model and one or more dynamic conditions of the vehicle. In a first example of the method, the first coolant system may additionally or alternatively include a battery coolant system including a battery of the vehicle and/or an inverter system controller (ISC) coolant system including an ISC, and/or the second coolant system may additionally or alternatively include an engine coolant system including an engine of the vehicle. A second example of the method optionally includes the first example, and further includes the method, wherein the one or more dynamic conditions of the vehicle includes a state of charge of the battery, a battery temperature, an engine temperature, and/or an ambient temperature of the vehicle, and/or wherein the estimated coolant temperature model is based at least on information from an electronic horizon data source and/or vehicle sensors indicating expected driving conditions for a vehicle trip, the expected driving conditions indicating expected battery and/or engine usage. A third example of the method optionally includes one or both of the first example and the second example, and further includes the method, wherein the vehicle is a hybrid vehicle, the method further comprising operating in one of a plurality of vehicle operation modes including a first, battery-operated mode, where the vehicle is operated only via the battery, a second, engine-operated mode, where the vehicle is operated only via the engine, and/or a third, hybrid mode, where the vehicle is operated via the battery and the engine. A fourth example of the method optionally includes one or more of the first through the third examples, and further includes the method, wherein the estimated coolant temperature model indicates an estimated coolant temperature for the battery coolant system and/or the ISC coolant system and for the engine coolant system for each of the plurality of vehicle operation modes as a function of one or more trip parameters for a vehicle trip and the one or more dynamic conditions of the vehicle. A fifth example of the method optionally includes one or more of the first through the fourth examples, and further includes the method, wherein the vehicle is operated in the first, battery-operated mode and wherein, responsive to determining from the one or more dynamic conditions of the vehicle and/or information from an electronic horizon data source an indication of an upcoming activation of the engine while the engine is shut off in the first, battery-operated mode, coolant from the battery coolant system and/or the ISC coolant system is directed to the heat exchanger to heat coolant from the engine coolant system that is directed to the heat exchanger. A sixth example of the method optionally includes one or more of the first through the fifth examples, and further includes the method, wherein the vehicle is operated in the second, engine-operated mode and wherein, responsive to determining during the operation in the second, engine-operated mode from the one or more dynamic conditions of the vehicle and/or information from an electronic horizon data source that the vehicle is predicted to enter a geo-fenced area in which engine operation is prohibited, coolant from the engine coolant system is directed to the heat exchanger to heat coolant from the battery coolant system and/or the ISC coolant system that is directed to the heat exchanger. A seventh example of the method optionally includes one or more of the first through the sixth examples, and further includes the method, wherein the vehicle is operated in the third, hybrid mode and wherein during the third, hybrid mode, responsive to determining that the engine and the battery are each maintained within a threshold range of an ideal operating temperature, the heat exchanger is deactivated and no coolant from the battery coolant system, the ISC coolant system, and the engine coolant system is directed to the heat exchanger. An eighth example of the method optionally includes one or more of the first through the seventh examples, and further includes the method, wherein controlling the flow of coolant through the heat exchanger comprises flowing coolant from the battery coolant system and/or the ISC coolant system to the engine coolant system to heat up a heater core for a cabin heating system of the vehicle.

The disclosure also provides for a vehicle system including a first coolant system, a second coolant system, a heat exchanger coupled to each of the first coolant system and the second coolant system, and a controller with computer readable instructions stored on non-transitory memory that, when executed, cause the controller to: estimate coolant temperatures for an upcoming vehicle trip, schedule operation of the heat exchanger to exchange heat between coolant from the first coolant system and coolant from the second coolant system based on the estimated coolant temperatures, and during the vehicle trip, adjust operation of the heat exchanger based on dynamic vehicle data. In a first example of the vehicle system, the first coolant system may additionally or alternatively include a battery coolant system including a battery of the vehicle and/or an inverter system controller (ISC) coolant system including an ISC, and/or the second coolant system may additionally or alternatively include an engine coolant system including an engine of the vehicle. A second example of the vehicle system optionally includes the first example, and further includes the vehicle system, wherein the ISC coolant system further comprises a DC/DC converter and a charger for charging the battery, and wherein the engine coolant system further comprises an exhaust gas recirculation (EGR) cooler and a heater core for a cabin heating system of the vehicle. A third example of the vehicle system optionally includes one or both of the first example and the second example, and further includes the vehicle system, wherein the battery coolant system further comprises a first low temperature radiator, the ISC coolant system further comprises a second low temperature radiator, and the engine coolant system further comprises a high temperature radiator, the heat exchanger being coupled to receive coolant from downstream of the ISC and upstream of the second low temperature radiator and/or to receive coolant from downstream of the engine and upstream of the high temperature radiator. A fourth example of the vehicle system optionally includes one or more of the first through the third examples, and further includes the vehicle system, wherein the heat exchanger is coupled to supply coolant to a first pump of the engine coolant system or to a second pump of the battery coolant system, the first pump being upstream of the engine and downstream of the high temperature radiator and the second pump being upstream of the battery and downstream of the first low temperature radiator. A fifth example of the vehicle system optionally includes one or more of the first through the fourth examples, and further includes the vehicle system, wherein scheduling operation of the heat exchanger includes selectively routing coolant from the ISC to the second pump via the heat exchanger, bypassing any other components of the ISC coolant system or the battery coolant system, and/or selectively routing coolant from the engine to the first pump via the heat exchanger, bypassing any other components of the engine coolant system. A sixth example of the vehicle system optionally includes one or more of the first through the fifth examples, and further includes the vehicle system, wherein the controller comprises a hybrid powertrain control module that is communicatively coupled to one or more sensors of the first coolant system and the second coolant system and to an electronic horizon data source, the estimated coolant temperatures being estimated based on data received from the one or more sensors and/or the electronic horizon data source.

The disclosure also provides for a method for thermal management in a vehicle, the method comprising determining a first set of vehicle parameters using measured data from one or more sensors of the vehicle, the first set of vehicle parameters indicating a vehicle status, determining a second set of vehicle parameters using information derived from one or more data sources including an electronic horizon, the second set of vehicle parameters indicating road load and drive event estimations for a vehicle trip, estimating coolant temperatures for a first coolant system and a second coolant system for the vehicle trip as a function of at least the second set of vehicle parameters, determining a heat exchanger control schedule for a heat exchanger coupled to the first coolant system and the second coolant system, the heat exchanger control schedule including instructions to operate the heat exchanger to maintain a respective ideal coolant temperature in the first coolant system and the second coolant system using the estimated coolant temperatures and the vehicle status, and sending instructions to one or more actuators associated with the heat exchanger to control flow of coolant from the first coolant system and/or the second coolant system through the heat exchanger according to the heat exchanger control schedule. In a first example of the method, the first coolant system may additionally or alternatively include a battery coolant system and/or an inverter system controller (ISC) coolant system, and/or the second coolant system may additionally or alternatively include an engine coolant system. A second example of the method optionally includes the first example, and further includes the method, wherein controlling the flow of coolant from the first coolant system and/or the second coolant system through the heat exchanger comprises flowing coolant from the battery coolant system and/or the ISC coolant system to the engine coolant system to heat up a heater core for a cabin heating system of the vehicle. A third example of the method optionally includes one or both of the first example and the second example, and further includes the method, wherein estimating the coolant temperatures includes mapping wheel power and/or torque request estimations for the vehicle trip and/or vehicle mode of operation estimations for the vehicle trip to a respective coolant temperature model for each of the first coolant system and the second coolant system, the wheel power and/or torque request estimations and the vehicle mode of operation estimations being derived from the road load and drive event estimations for the vehicle trip.

In another representation, a method for thermal management in a vehicle includes receiving from a CAN bus, an electronic horizon data source, and/or one or more sensors of the vehicles, vehicle data and controlling a heat exchanger to exchange heat between a plurality of coolant circuits of the vehicle based on the vehicle data. In a first example of the method, the plurality of coolant circuits may additionally or alternatively be thermally isolated from one another via one or more valves controlling flow of coolant to and from the heat exchanger. A second example of the method optionally includes the first example, and further includes the method, wherein the vehicle data includes navigation data, route attributes, and/or coolant temperature for one or more of the coolant circuits.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a heat exchanger in a vehicle, the method comprising:
controlling a flow of coolant from each of a first coolant system and a second coolant system through the heat exchanger based on an estimated coolant temperature model and one or more dynamic conditions of the vehicle, wherein the first coolant system includes a battery coolant system including a battery of the vehicle and an inverter system controller (ISC) coolant system including an ISC, and wherein the second coolant system includes an engine coolant system including an engine of the vehicle;
wherein the one or more dynamic conditions of the vehicle include a state of charge of the battery and/or a battery temperature.

2. The method of claim 1, wherein the one or more dynamic conditions of the vehicle includes an engine temperature, and/or an ambient temperature of the vehicle and wherein the estimated coolant temperature model is based at least on information from an electronic horizon data source and/or vehicle sensors indicating expected driving conditions for a vehicle trip, the expected driving conditions indicating expected battery and/or engine usage.

3. The method of claim 1, wherein the vehicle is a hybrid vehicle, the method further comprising operating in one of a plurality of vehicle operation modes including a first, battery-operated mode, where the vehicle is operated only via the battery, a second, engine-operated mode, where the vehicle is operated only via the engine, and/or a third, hybrid mode, where the vehicle is operated via the battery and the engine.

4. The method of claim 3, wherein the estimated coolant temperature model indicates an estimated coolant temperature for the battery coolant system and/or the ISC coolant system and for the engine coolant system for each of the plurality of vehicle operation modes as a function of one or more trip parameters for a vehicle trip and the one or more dynamic conditions of the vehicle.

5. The method of claim 3, wherein the vehicle is operated in the first, battery-operated mode and wherein, responsive to determining from the one or more dynamic conditions of the vehicle and/or information from an electronic horizon data source an indication of an upcoming activation of the engine while the engine is shut off in the first, battery-operated mode, coolant from the battery coolant system and/or the ISC coolant system is directed to the heat exchanger to heat coolant from the engine coolant system that is directed to the heat exchanger.

6. The method of claim 3, wherein the vehicle is operated in the second, engine-operated mode and wherein, responsive to determining during the operation in the second, engine-operated mode from the one or more dynamic conditions of the vehicle and/or information from an electronic horizon data source that the vehicle is predicted to enter a geo-fenced area in which engine operation is prohibited, coolant from the engine coolant system is directed to the heat exchanger to heat coolant from the battery coolant system and/or the ISC coolant system that is directed to the heat exchanger.

7. The method of claim 3, wherein the vehicle is operated in the third, hybrid mode and wherein during the third, hybrid mode, responsive to determining that the engine and the battery are each maintained within a threshold range of an operating temperature, the heat exchanger is deactivated and no coolant from the battery coolant system, the ISC coolant system, and the engine coolant system is directed to the heat exchanger.

8. The method of claim 3, wherein controlling the flow of coolant through the heat exchanger comprises flowing coolant from the battery coolant system and/or the ISC coolant system to the engine coolant system to heat up a heater core for a cabin heating system of the vehicle.

9. A vehicle system comprising:
a first coolant system comprising a battery coolant system including a battery of the vehicle and/or an inverter system controller (ISC) coolant system including an ISC;
a second coolant system, wherein the second coolant system includes an engine coolant system including an engine of the vehicle;
a heat exchanger coupled to each of the first coolant system and the second coolant system; and
a controller with computer readable instructions stored on non-transitory memory that, when executed, cause the controller to:
estimate coolant temperatures for an upcoming vehicle trip;
schedule operation of the heat exchanger to exchange heat between coolant from the first coolant system and coolant from the second coolant system based on the estimated coolant temperatures; and
during the vehicle trip, adjust operation of the heat exchanger based on dynamic vehicle data;
wherein the battery coolant system further comprises a first low temperature radiator, the ISC coolant system further comprises a second low temperature radiator, and the engine coolant system further comprises a high temperature radiator, the heat exchanger being coupled to receive coolant from downstream of the ISC and upstream of the second low temperature radiator and/or to receive coolant from downstream of the engine and upstream of the high temperature radiator.

10. The vehicle system of claim 9, wherein the controller comprises a hybrid powertrain control module that is communicatively coupled to one or more sensors of the first coolant system and the second coolant system and to an electronic horizon data source, the estimated coolant temperatures being estimated based on data received from the one or more sensors and/or the electronic horizon data source.

11. The vehicle system of claim 9, wherein the ISC coolant system further comprises a DC/DC converter and a charger for charging the battery, and wherein the engine coolant system further comprises an exhaust gas recirculation (EGR) cooler and a heater core for a cabin heating system of the vehicle.

12. The vehicle system of claim 9, wherein the heat exchanger is coupled to supply coolant to a first pump of the engine coolant system or to a second pump of the battery coolant system, the first pump being upstream of the engine and downstream of the high temperature radiator and the second pump being upstream of the battery and downstream of the first low temperature radiator.

13. The vehicle system of claim 12, wherein scheduling operation of the heat exchanger includes selectively routing coolant from the ISC to the second pump via the heat exchanger, bypassing any other components of the ISC coolant system or the battery coolant system, and/or selectively routing coolant from the engine to the first pump via the heat exchanger, bypassing any other components of the engine coolant system.

14. A method for thermal management in a vehicle, the method comprising:
determining a first set of vehicle parameters using measured data from one or more sensors of the vehicle, the first set of vehicle parameters indicating a vehicle status;
determining a second set of vehicle parameters using information derived from one or more data sources including an electronic horizon, the second set of vehicle parameters indicating road load and drive event estimations for a vehicle trip;
estimating coolant temperatures for a first coolant system and a second coolant system for the vehicle trip as a function of at least the second set of vehicle parameters;
determining a heat exchanger control schedule for a heat exchanger coupled to the first coolant system and the second coolant system, the heat exchanger control schedule including instructions to operate the heat exchanger to maintain a respective coolant temperature in the first coolant system and the second coolant system using the estimated coolant temperatures and the vehicle status; and
sending instructions to one or more actuators associated with the heat exchanger to control flow of coolant from the first coolant system and/or the second coolant system through the heat exchanger according to the heat exchanger control schedule;
wherein the first coolant system includes a battery coolant system and an inverter system controller (IS C) coolant system, and wherein the second coolant system includes an engine coolant system; and
wherein the battery coolant system further comprises a first low temperature radiator, the ISC coolant system further comprises a second low temperature radiator, and the engine coolant system further comprises a high temperature radiator, the heat exchanger being coupled to receive coolant from downstream of the ISC and upstream of the second low temperature radiator and/or to receive coolant from downstream of the engine and upstream of the high temperature radiator.

15. The method of claim 14, wherein controlling the flow of coolant from the first coolant system and/or the second coolant system through the heat exchanger comprises flowing coolant from the battery coolant system and/or the ISC coolant system to the engine coolant system to heat up a heater core for a cabin heating system of the vehicle.

16. The method of claim 14, wherein estimating the coolant temperatures includes mapping wheel power and/or torque request estimations for the vehicle trip and/or vehicle mode of operation estimations for the vehicle trip to a respective coolant temperature model for each of the first coolant system and the second coolant system, the wheel power and/or torque request estimations and the vehicle mode of operation estimations being derived from the road load and drive event estimations for the vehicle trip.

\* \* \* \* \*